US012050699B2

(12) United States Patent
Fong et al.

(10) Patent No.: US 12,050,699 B2
(45) Date of Patent: Jul. 30, 2024

(54) DEVICE INDEPENDENT CRYPTO ENGINE

(71) Applicant: PPIP LLC, Chandler, AZ (US)

(72) Inventors: Michael Fong, Chandler, AZ (US);
Neric Hsin-wu Fong, Tempe, AZ (US);
Mohamad Ahmad Foustok, Groveland, FL (US)

(73) Assignee: PPIP, LLC, Chandler, AZ (US)

( * ) Notice: Subject to any disclaimer, the term of this patent is extended or adjusted under 35 U.S.C. 154(b) by 312 days.

(21) Appl. No.: 17/536,427

(22) Filed: Nov. 29, 2021

(65) Prior Publication Data

US 2023/0169185 A1 Jun. 1, 2023

(51) Int. Cl.
G06F 21/60 (2013.01)
G06F 21/31 (2013.01)
H04L 9/00 (2022.01)
H04L 9/06 (2006.01)
H04L 9/08 (2006.01)
H04L 9/32 (2006.01)

(52) U.S. Cl.
CPC ............ *G06F 21/602* (2013.01); *G06F 21/31* (2013.01); *G06F 21/606* (2013.01); *H04L 9/002* (2013.01); *H04L 9/0618* (2013.01); *H04L 9/0637* (2013.01); *H04L 9/0819* (2013.01); *H04L 9/0894* (2013.01); *H04L 9/3236* (2013.01); *H04L 9/3247* (2013.01); *H04L 2209/12* (2013.01)

(58) Field of Classification Search
CPC ....... H04L 9/0637; H04L 9/0618; H04L 9/14; H04L 9/0631; H04L 9/002
See application file for complete search history.

(56) References Cited

U.S. PATENT DOCUMENTS

| | | | | |
|---|---|---|---|---|
| 5,301,247 A | * | 4/1994 | Rasmussen | H04L 9/0637 380/46 |
| 10,181,054 B1 | * | 1/2019 | Lyadvinsky | G06F 21/6209 |
| 2008/0123859 A1 | * | 5/2008 | Mamidwar | H04L 9/0631 380/278 |
| 2013/0019096 A1 | * | 1/2013 | Palzer | H04W 12/06 713/168 |
| 2013/0103945 A1 | * | 4/2013 | Cannon | H04L 9/14 713/168 |
| 2013/0262868 A1 | * | 10/2013 | Friedman | H04L 9/0618 713/171 |

(Continued)

*Primary Examiner* — Barbara B Anyan
(74) *Attorney, Agent, or Firm* — Fernando & Partners, LLP

(57) ABSTRACT

In accordance with some embodiments, an apparatus includes a crypto engine that provides device independent crypto services. The apparatus includes a housing arranged to hold a device. The apparatus also includes a non-transitory memory that further includes a key store for storing a first key. The apparatus further includes a communication device at least partially supported by the housing and connectable to the device to establish a communication channel with the device. The apparatus also includes a controller (e.g., a crypto engine) that receives, via the communication channel, a first portion of data from the device, performs a cryptographic operation on the first portion of the data using the first key to generate a modified first portion, sends, via the communication channel, the modified first portion to the device, and enables the device to derive a second portion of the data using the modified first portion.

18 Claims, 8 Drawing Sheets

(56) References Cited

U.S. PATENT DOCUMENTS

| | | | |
|---|---|---|---|
| 2013/0275545 A1* | 10/2013 | Baptist | H04L 67/01 709/215 |
| 2018/0069699 A1* | 3/2018 | Bowman | H04L 9/002 |
| 2021/0016709 A1* | 1/2021 | Ihlenburg | H04N 13/257 |

* cited by examiner

DEVICE INDEPENDENT CRYPTO ENGINE

TECHNICAL FIELD

This relates generally to the field of security, and more specifically, to the field of using a device independent crypto engine for enhanced security.

BACKGROUND

Previously existing email solutions use private keys stored on a personal communication device for decrypting email communications. Due to its limited resources, a personal communication device is inherently insecure. When an adversary hacks the personal communication device and obtains the private key, email communications in the mailbox can be decrypted and the communications are exposed.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
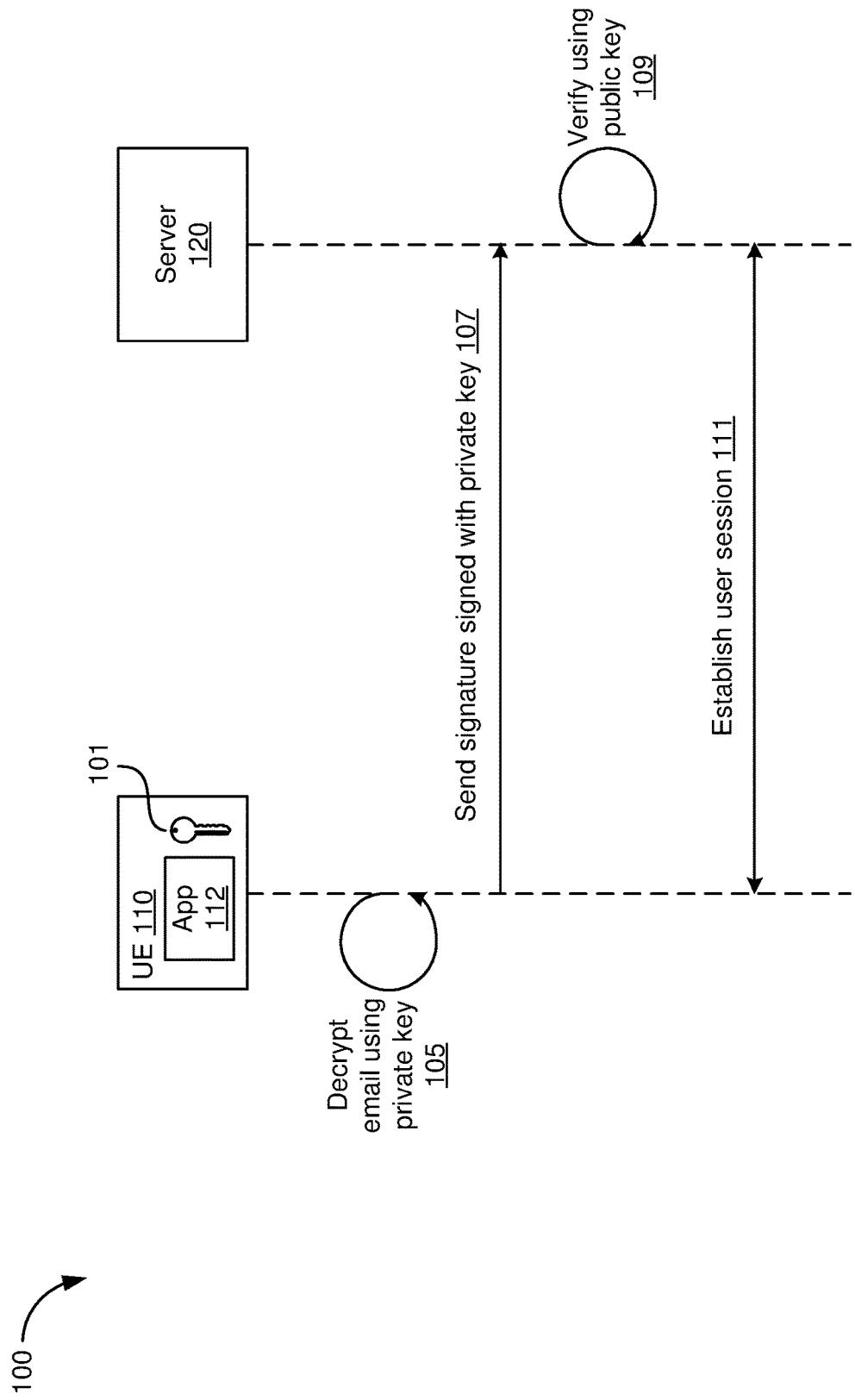
FIG. 1 is a sequence diagram illustrating crypto operations on a user equipment.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

A safe case described herein protects a personal communication device by providing enhanced crypto services, such as signing, verifying, encrypting, and/or decrypting, etc., where the enhanced crypto services and the data communication path are handled by a device independent crypto engine. In some embodiments, the safe case, which is a modular device separate and distinct from the personal communication device, stores and manages the keys and/or certificates for the crypto services. In the case of the personal communication device being compromised, without the keys, certificates, and/or the device independent crypto engine, data on the personal communication device cannot be accessed and/or distributed.

In some embodiments, a method is performed in a system with a device and an apparatus. The device includes an application and an adapter integrated with the application. The apparatus includes a housing arranged to hold the device, a communication device that is at least at least partially supported by the housing and connectable to the device to establish a communication channel, a non-transitory memory that includes a key store for storing a key, and a controller. In some embodiments, the method is performed by the controller of the apparatus and includes receiving, via the adapter and over the communication channel, at least a portion of data. The method further includes performing a cryptographic operation on at least the portion of the data using the key to generate modified data. The method also includes sending, via the adapter and over the communication channel, the modified data to the device to enable the device (e.g., by the application) to access the data, including accessing the modified data.

In accordance with some embodiments, an apparatus includes one or more processors, non-transitory memory, and one or more programs; the one or more programs are stored in the non-transitory memory and configured to be executed by the one or more processors, and the one or more programs include instructions for performing or causing performance of the operations of any of the methods described herein. In accordance with some embodiments, a non-transitory computer readable storage medium has stored therein instructions which, when executed by one or more processors of an apparatus, cause the apparatus to perform or cause performance of the operations of any of the methods described herein. In accordance with some embodiments, an apparatus includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when", "upon", "in response to determining", or "in response to detecting", depending on the context. Similarly, the phrase "if it is determined" or "if [a stated condition or event] is detected" is, optionally, construed to mean "upon determining", "in response to determining", "upon detecting [the stated condition or event]," or "in response to detecting [the stated condition or event]," depending on the context.

It should be appreciated that in the development of any actual embodiments (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, a simplified sequence diagram 100 illustrating crypto operations on a user equipment 110. Some devices (e.g., the user equipment 110) store keys locally, e.g., storing a private key 101 in a key chain on the user equipment 110. When an application 112, e.g., an email client, running on the user equipment 110 requests access to data on the user equipment 110, e.g., an email, the application can use the private key 101 to decrypt the data in step 105. As such, an attacker may compromise the private key 101 and use the private key 101 to access the email (and possibly all emails) on the user equipment 110.

Further, the application 112 is often configured to communicate with other devices, such as a server 120. In the email application example above, when sending an email, the application 112 may send a signature signed with the private key 101 to the server 120 in step 107. The server 120 verifies the signature using a public key in step 109. Upon successful verification, the server 120 allows a user session with the application 112 on the user equipment 110. As such, once the private key 101 is compromised, a third party can sign the signature using the private key 101, spoof the server 120 to establish sessions, and communicate the data (e.g., the email) on the user equipment 110 to a remote source.

Figure 2:
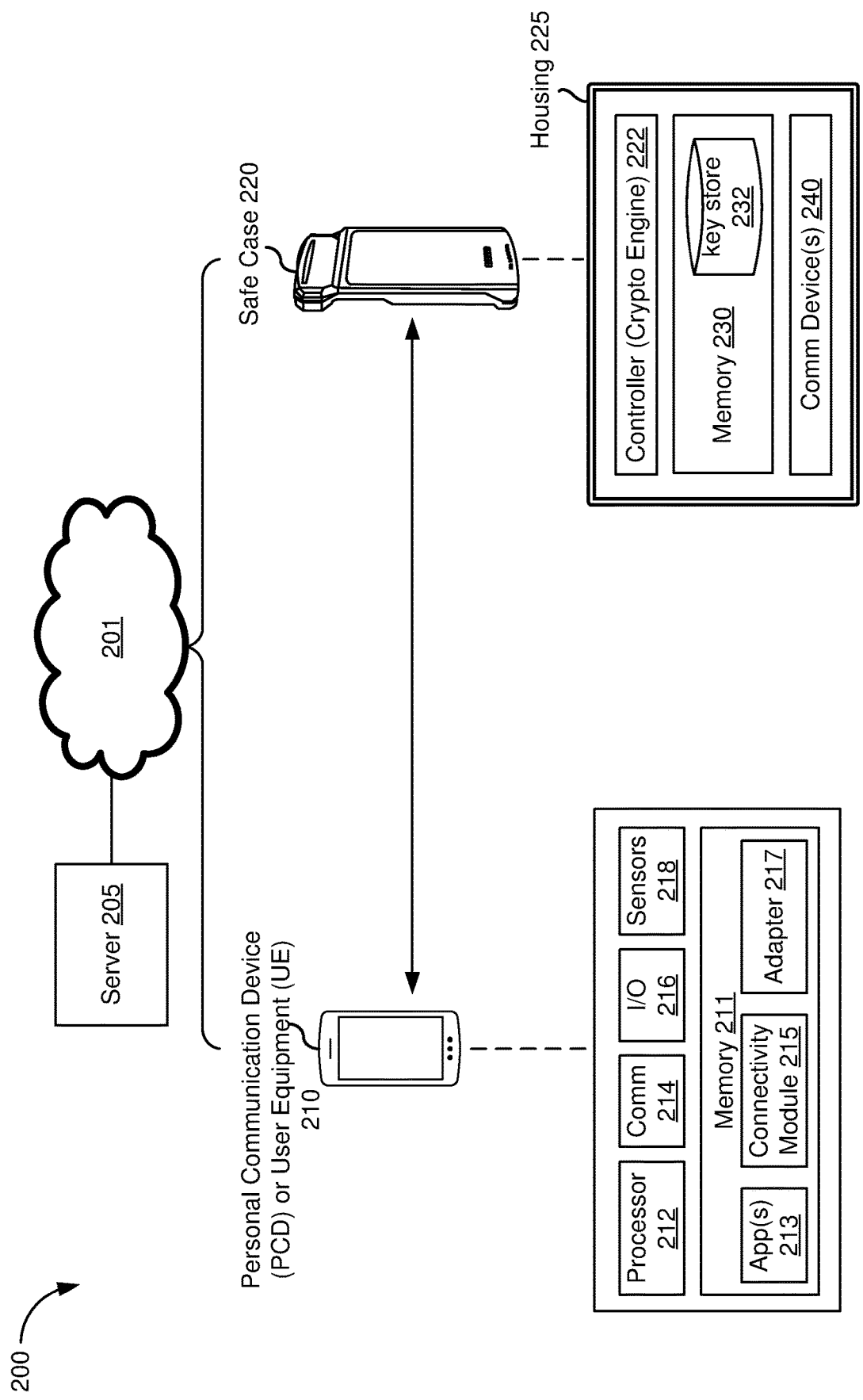
FIG. 2 is a block diagram illustrating an exemplary system that utilizes a crypto engine on a safe case to provide device independent crypto services in accordance with some embodiments.

FIG. 2 shows an exemplary system 200 that utilizes a crypto engine on a safe case 220 to provide device independent crypto services in accordance with some embodiments. In the exemplary system 200, a safe case 220 performs cryptographic operations and provides device independent crypto services to a user equipment 210. As such, the safe case 220 actively protects data on the user equipment 210. The user equipment (UE) 210 (also referred to hereinafter as a personal communication device 210 or a device 210) protected by the safe case 220 can be a smartphone, a wearable, a tablet, a laptop, a computer, etc. The user equipment 210 includes a processor 212, communication devices 214, input/output (I/O) devices 216, sensors 218, etc. Examples of the one or more communication devices 214 include a WiFi chipset, a Bluetooth (BT)/Bluetooth Low Energy (BLE) chipset, a Near Field Communication (NFC) chipset, a Global Positioning System (GPS), a cellular communication chipset, a Universal Serial Bus (USB) chipset, a physical connector, etc. Examples of the sensors 218 include motion sensor(s), touch sensors and/or force sensors coupled to a touch sensitive surface, sound or acoustic sensors, and/or light sensors, etc.

In some embodiments, the user equipment 210 also includes a non-transitory memory 211 for storing one or more programs, e.g., one or more applications 213, a connectivity module 215, and an adapter 217, etc. The one or more programs are configured to be executed by the processor 212, and the one or more programs include instructions for performing or causing performance of the operations of any of the methods described herein. In some embodiments, the connectivity module 215 facilitates connection establishment with the safe case 220 using the communication device(s) 214. In some embodiments, the adapter 217 is integrated with the application(s) 213 to enable the application(s) 213 to utilize the crypto services provided by the safe case 220. In some embodiments, the connectivity module 215 is coupled with the adapter 217 to register the adapter 217 and/or the application 213 so that sessions can be established between the adapter 217 and the safe case 220 to exchange messages for crypto services.

In some embodiments, the safe case 220 includes a housing 225. The housing 225 is separate and distinct from the housing of the user equipment 210. In some embodiments, the housing 225 is arranged to receive and hold the user equipment 210. As such, the safe case 220 and the user equipment 110 are distinctive devices, e.g., the safe case 220 has its own housing and is separate from the user equipment 110. In some embodiments, the housing 225 supports communication device(s) 240, so that the safe case 220 can pair with the user equipment 210 through wired connections or wireless connections and/or communicate with a remote server 205 over a network 201. In some embodiments, the safe case 220, when coupled with the user equipment 210 through wireless communication, the safe case 220 (or the crypto services performed by the safe case 220) can be remote from the user equipment 210. As such, the user equipment 210 can utilize the crypto services without the safe case 220 being next to the user equipment 210. As such, the safe case 220 can be a modular device, such that the housing 225 of the safe case 120 allows the safe case 120 to be a distinct component to be attached and/or paired with the UE 110, e.g., as an attachable puck to the user equipment 220.

Different from conventional bases or cases that merely provide structural support, the safe case 220 actively monitors and analyzes the user equipment 210 and takes appropriate actions to protect the user equipment 210 against attacks. Accordingly, the safe case 220 provides enhanced security and protects the privacy of the user of the user equipment 210. In some embodiments, the housing 225 includes a plurality of components mateable with one another. In other words, the plurality of components, once mated with one another, forms an assembly to hold the user equipment 210.

In some embodiments, the assembly includes one or more moveable components (e.g., a hood and/or a shutter) as well as non-moveable components. For example, the one or more moveable components can slide to one or more positions (e.g., hood up or down or shutter open or close) to mate (e.g., mechanically and/or electronically) with the non-moveable components. In some embodiments, when mated, the one or more moveable and non-moveable components form a partial enclosure that at least partially supports and holds the user equipment 210. In some other embodiments, the housing assembly forms a whole enclosure encapsulating the user equipment 210.

In some embodiments, when the one or more moveable components are in the first position, the assembly, along with other components of the safe case 220, protects the user equipment 210 against tracking or spying, e.g., by audio jamming, camera covering, and/or RF shielding, etc. When the one or more moveable components of the assembly are in a second position (e.g., hood slid up or open shutter), the user can take the user equipment 110 out of the enclosure formed by the housing assembly and place the user equipment 110 in a non-protected mode.

In some embodiments, the communication device(s) 240 and sensors (not shown) on the safe case 220 are at least partially supported by the housing 225 facilitate independent verification of the data from the user equipment 210. Examples of the communication device(s) 240 and the sensors on the safe case 220 include, but are not limited to, a WiFi chipset, a BT/BLE chipset, an NFC chipset, a GPS chipset, a cellular communication chipset, a USB chipset, a physical connector, motion sensor(s), an IMU, touch sensors and/or force sensors coupled to a touch sensitive surface, sound or acoustic sensors, and/or light sensors, etc.

The communication device(s) 240 are connectable (wirelessly or through a wired connection) with communication device(s) 214 on the user equipment 210. In some embodiments, the safe case 220 includes a controller 222 that facilitates establishing a secure communication channel between the user equipment 210 and the safe case 220. In some embodiments, the controller 222 also provides a crypto engine that can perform cryptographic operations, such as encrypting, decrypting, signing, and/or verifying data from the user equipment 210. In addition to performing cryptographic operations and/or providing device independent crypto services, in some embodiments, through the secure communication channel, the controller 222 causes transmission of signals to control the communication, processing, data storage, access, and/or other functions of the user equipment 210. For example, the controller 222 can cause transmission of signals through the secure communication channel to trigger activation or de-activation of one or more components on the user equipment 210. Further, based on active monitoring of the user equipment 210, the controller 222 can allow or disallow access to the crypto services provided by the safe case 220.

In some embodiments, the safe case 220 includes a non-transitory memory 230, which further includes a key store 232 for storing keys and/or certificates. The keys and/or certificates can be used for cryptographic operations and/or crypto services, such as encryption, decryption, signing, and/or verification. In some embodiments, the keys and/or certificates can also be used to encrypt communications through the secure communication channel with the user equipment 210 and/or the server 205. For example, all connections to and from the safe case 220 carry end-to-end encrypted traffic protected with Elliptic-curve cryptography (ECC) 384-bit keys and/or 256-bit Advanced Encryption Standard-Counter with Cipher Block Chaining-Message Authentication Code (AES-CCM).

To perform cryptographic operations and/or provide crypto services, in some embodiments, the safe case 220 allows requests of creation of new keys and/or new key pairs within the safe case 220 and supports any type of keys. In some embodiments, the safe case 220 can also store keys that are generated by another device, e.g., obtained by the safe case 220. Further, the safe case 220 allows certificate signing requests (CSRs) and/or stores certificates in the key store 232 for retrieval. In some embodiments, the key store 232 also stores a root key. For example, the safe case 220 can provide a hardware root of trust that starts from the hardware layer, e.g., using a specialized system and crypto architecture to create a root key and/or using a hardware true random number generator to derive the root key. The safe case 220 then stores the root key in the key store 232. As such, the root key is not exposed and cannot be externally extracted. In some embodiments, the safe case 220 can then generate certificates (e.g., an X.509 certificate bundle), provision such certificates, and/or store such certificates within the safe case 220. Thus, the safe case 220 provides secure crypto services that are rooted in an independent hardware root of trust.

The safe case 220 is a modular apparatus. The housing 225 allows different user equipment 210 to be inserted into and/or taken out of the housing 225, and the safe case 220 provides independent crypto services when pairing with a respective user equipment 210. Further, the safe case 220 can include a peripheral interface (not shown) that is at least partially supported by the housing 225 to allow the safe case 220 to connect to a supplemental functional device (also known as a backpack). A supplemental functional device or a backpack is a device connectable to the user equipment 210 through the safe case 220 and provides supplemental functions to the user equipment 210. The backpack is also a modular and detachable device, e.g., includes its own housing and is attachable to the housing 225. In some embodiments, the backpack snaps onto the back of the safe case 220 while the safe case 220 receives the user equipment 210 and holds the user equipment 210 on the front side of the safe case 220.

The backpack provides additional hardware and software functionalities to a user of the user equipment 210 and/or the safe case 220. For instance, the backpack can include sensors and/or processors for detecting movements, odor, RF energy, biometric markers, etc. In another example, the backpack can include one or more communication components for communicating with the safe case 220, the user equipment 210, and/or the server 205. As such, in system 200 as shown in FIG. 2, the server 205 can securely communicate with the user equipment 210, the safe case 220, and/or the backpack through different communication channels and/or paths. For example, the server 205 can communicate with the backpack and/or the safe case 220 directly via the remote communication components (e.g., the communication device(s) 240) on the safe case 220 and/or the backpack. Alternatively, the server 205 can communicate with the backpack and/or the safe case 220 through the communication device(s) 214 on the user equipment 210, e.g., an end-to-end encrypted communication channel connecting the server 205, the user equipment 210, the safe case 220, and/or the backpack.

The modular configurations allow a user to enhance the security on the user equipment 210. The backpack can be changed and/or customized to provide different components and functions. For example, in order to protect the user equipment 210 from attacks through wireless communication, a backpack can be attached to the safe case 220 to utilize the RF signal processing hardware, firmware, and/or software on the backpack for RF emitter detection. In another example, a portion of the crypto engine and/or the key store 232 can be moved to the backpack to offload the crypto services. Thus, the backpack provides customizable capabilities for enhanced security and privacy protection of the user equipment 210.

Figure 3:
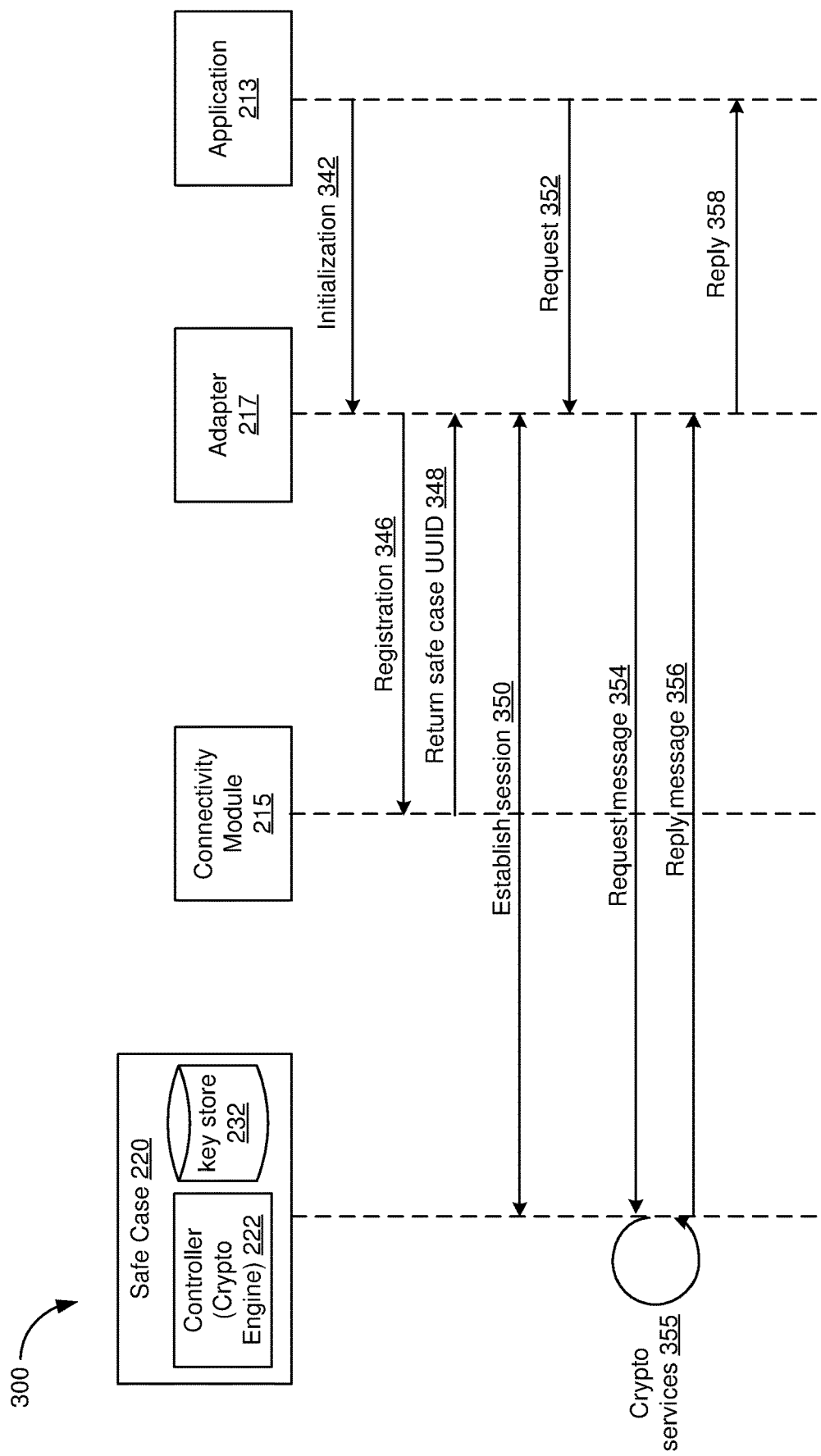
FIG. 3 is a sequence diagram illustrating utilizing the crypto engine on the safe case for device independent crypto services in accordance with some embodiments.

FIG. 3 shows a simplified sequence diagram 300 illustrating utilizing the crypto engine 222 on the safe case 220 for device independent crypto services, in accordance with some embodiments. As described above with reference to FIG. 2, in some embodiments, the adapter 217 is integrated with the application 213 so that in step 342, the application 213 performs initialization of the adapter 217, e.g., registering the adapter 217 to enable the application 213 to send requests to the adapter 217 and receive replies from the adapter 217.

In some embodiments, the connectivity module 215 establishes connection(s) with the safe case 220, e.g., through wired and/or wireless connection. In some embodiments, in step 346, the adapter 217 registers with the connectivity module 215, so that the connectivity module 215 can forward requests from the adapter 217 to the safe case 220, and in particular, to the crypto engine 222 on the safe case 220. In step 348, the connectivity module 215 returns an identifier of the safe case 220 (e.g., a safe case universal unique identifier (UUID)), so that the adapter 217 can use the identifier to establish a secure session with the modular safe case in step 350, e.g., associating the identifier of the safe case 220 with the secure session.

Once the secure session is established, when the application 213 sends a request to the adapter 217 in step 352, the adapter 217 generates a request message and sends the request message to crypto engine 222 on the safe case 220 in step 354. In step 355, the crypto engine 222 performs cryptographic operations and/or crypto services in response to receiving the request message, e.g., utilizing the keys stored in the key store 232 to sign, verify, encrypt, and/or decrypt, etc. The crypto engine 222 further sends the results of the crypto services via a reply message to the adapter 217 over the secure session in step 356. The adapter 217 then replies to the application 213 based on the reply message from the crypto engine 222 in step 358.

Relative to the system 100 as shown in FIG. 1, the safe case 220 in FIGS. 2 and 3 utilizes the crypto engine 222 and the key store 232 to provide device independent crypto services. Even if the application 213 and/or the user equipment are compromised, with the key(s) stored on the safe case 220 (i.e., independent of the user equipment), the attacker would not be able to decipher the data and/or distributes deciphered data from the user equipment.

Figure 4:
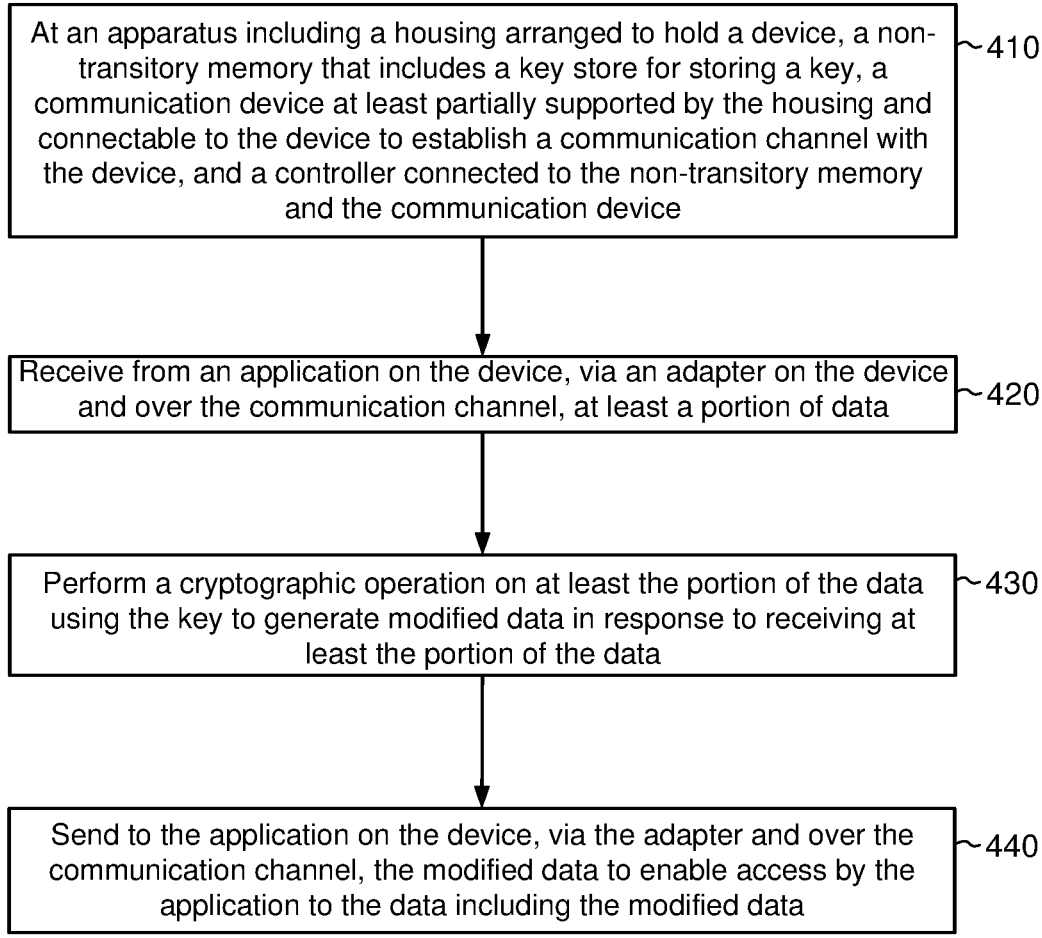
FIG. 4 is a flowchart illustrating a method for providing device independent crypto services in accordance with some embodiments.

FIG. 4 is a flowchart illustrating a method 400 for providing device independent crypto services in accordance with some embodiments. In some embodiments, the method 400 is performed at an apparatus (e.g., the safe case 220) in the system 200 that includes a device (e.g., the device 210) and the apparatus, as represented by block 410. In some embodiments, the device includes an application (e.g., the application 213 as shown in FIG. 3) and an adapter (e.g., the adapter 217 as shown in FIGS. 2 and 3), where the adapter is integrated with the application. In some embodiments, the apparatus includes a housing (e.g., the housing 225 in FIG. 2) that is arranged to hold the device, e.g., holding the user equipment 210 in FIG. 2. In some embodiments, the apparatus also includes a communication device (e.g., one of the communication device(s) 240, FIG. 2) that is at least partially supported by the housing and connectable to the device to establish a communication channel, e.g., to pair the communication device 240 and the communication device 214 in FIG. 2. In some embodiments, the apparatus also includes a non-transitory memory (e.g., the memory 230 in FIG. 2) that includes a key store for storing a key (e.g., in the key store 232 in FIGS. 2 and 3). In some embodiments, the apparatus additionally includes a controller (e.g., the controller/crypto engine 222 in FIG. 2).

In some embodiments, as represented by block 420, the controller receives from the application on the device, via the adapter and over the communication channel, at least a portion of data. For example, the data can be emails, objects stored in a database, pictures, videos, files, etc. on the user equipment. Following the sequence diagram shown in FIG. 3, after the connectivity module 215 establishes the session over the connection between the safe case 220 and the user equipment, when the application 213 attempts to access the data, the application 213 sends a request to the adapter 217 integrated with the application 213 in step 352 and the adapter 217 packages at least a portion of the data in a request message to send to the controller/crypto engine 222 over the established session in step 354.

In some embodiments, as represented by block 430, the controller performs a cryptographic operation on at least the portion of the data, e.g., encryption, decryption, signing and verification of at least the portion of data using the key to generate modified data in response to receiving at least the portion of the data. For example, the modified data can be decrypted emails, multimedia content items (e.g., pictures, videos, audios, texts, etc.), signature verified data, etc. Further, in some embodiments, as represented by block 440, the controller sends to the application on the device, via the adapter and over the communication channel, the modified data to enable access by the application to the data including the modified data.

Following the method 400, device independent crypto services are provided by the modular apparatus, which is distinct from the device. Further, in some embodiments, the safe case is capable of generating the key (and/or the certificate) backed by attestation and can store the key (and/or the certificate) in the keystore that is independent of the device. In some embodiments, the key is stored in a secure portion of the non-transitory memory of the safe case and the key never leaves the safe case secure environment. As such, because the key is not extractable from the safe case, relative to storing the key on the user equipment as shown in FIG. 3, the system in FIG. 2 is more secure.

In some embodiments, the safe case also gates access to the crypto services, such as by authenticating a user (and/or performing continuous multifactor authentication of the user) and ceasing to provide the crypto services when failing to authenticate the user. For example, in FIG. 2, using the sensors and/or the communication device(s) 240 on the safe case 220, the safe case 220 can independently collect and compare the data from the user equipment 210 and/or a backpack coupled with the safe case 220 to determine whether the user equipment 210 has been compromised and/or whether the user of the user equipment 210 is malicious. In some embodiments, based on policies (e.g., configured locally on the safe case 220 and/or configured remotely through the server 205 in FIG. 2), the safe case 220 can restrict access to the crypto services, e.g., based on time, location, and/or network information, etc. Further, in some embodiments, based on the authentication result and/or policies, the safe case 220 can cease to perform cryptographic operations and/or cease to provide crypto services upon determining that the user equipment 210 has been compromised and/or the user is malicious, e.g., by disconnecting the connection between the safe case 220 and the user equipment 210 through the communication device(s) 240 and/or the connectivity module 215 in FIG. 2 and/or by terminating the session established in step 350 in FIG. 3. On the other hand, in some embodiments, when the policies and/or authentication indicate that certain criteria have been met, the safe case 220 can allow access to the crypto services and perform cryptographic operations. As such, with the active monitoring of the user equipment, using the safe case 220 to gate the access to crypto services is more secure than having the user equipment perform on-device crypto services.

Figure 5A:
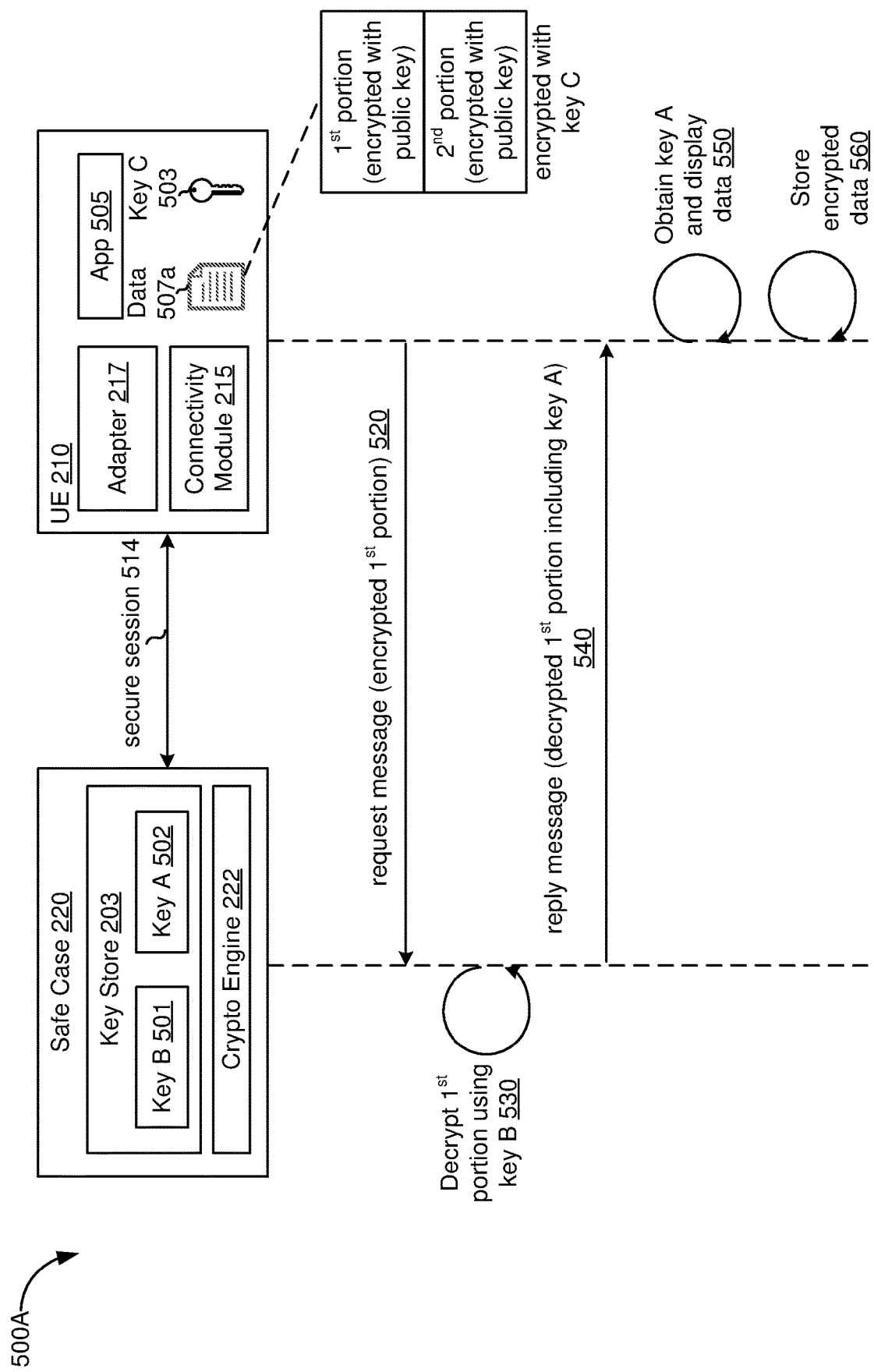
FIGS. 5A and 5B are sequence diagrams illustrating utilizing the device independent crypto engine on the safe case for displaying and sending email data in accordance with some embodiments.
Figure 5B:
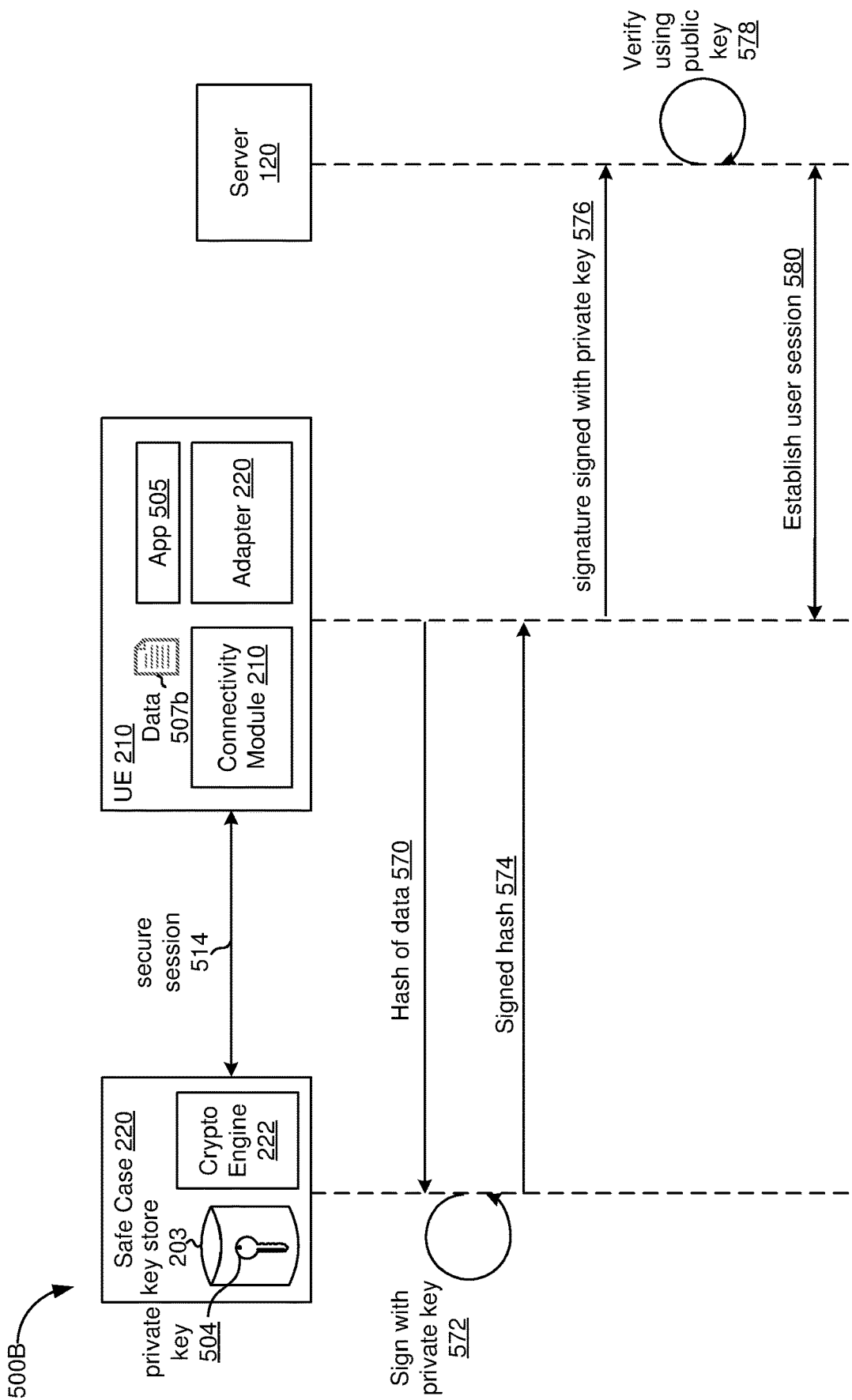

FIGS. 5A and 5B show simplified sequence diagrams 500A and 500B illustrating utilizing the device independent crypto engine 222 on the safe case 220 for displaying and sending email data, in accordance with some embodiments. In some embodiments, the user equipment 210 includes an application 505 (e.g., the application 213 in FIGS. 2 and 3) that is capable of accessing data on the user equipment 210 and/or sending the data to a remote source. For example, the application 505 can be an email client for retrieving email data from the user equipment 310, displaying emails, and/or sending emails. In some embodiments, the user equipment 310 also includes the connectivity module 215 and the adapter 217 integrated with the application 505 as described above with reference to FIGS. 2 and 3.

As described above with reference to FIG. 3, the connectivity module 215 establishes a secure session 514 with the safe case 220 following the steps 342-350. The adapter 217 upon receiving a request from the application 505, sends a request message to the crypto engine 222 over the secure session 514. For instance, when the application 505 retrieves email data 507*a* from the user equipment 210, the adapter 217 detects the retrieval request and enables the application 505 to send a portion of the email data 507*a* (e.g., email header) to the safe case 220 in step 520. In some embodiments, the adapter 217 encapsulates a secure Multipurpose Internet Mail Extensions (s/MIME) email header in a request message and sends to the request message to the crypto engine 222 over the secure session 514.

Upon receiving the request, crypto engine 222 utilizes one or more keys stored in the key store 232 for decrypting the encrypted email header encapsulated in the request message. For example, the key store 232 can include a private key B 501. In some embodiments, upon receiving the s/MIME email header in the request message, the crypto engine 222 uses the private key B 501 to decrypt the email header in step 530. Further, the crypto engine 222 composes a reply message, which includes the decrypted portion (e.g., the decrypted email header) and another key for example. In step 540, the crypto engine 222 then sends the reply message over the secure session 514.

In some embodiments, upon receiving the reply message, the adapter 217 obtains symmetric key A 502 from the reply message in step 550, and uses the symmetric key A 502 to decrypt another portion of the email data 507*a*, such as the email body. Once both the email header and the email body are decrypted, the application 213 can display the email data 507*a* in unencrypted form. In some embodiments, as shown in step 560 of FIG. 5A, the email data 507*a* stored on the user equipment 210 is encrypted with a public key, e.g., a corresponding public key to the private key B 501. As such, by relying on the safe case 220 to produce the key for decrypting the email body each and every time an email is decrypted, the device independent crypto engine 222 and/or the safe case 220 enhance security.

In some previously existing solutions, the user equipment 210 takes a shortcut by re-encrypting the email data 507*a* (e.g., the 2nd portion, or the 1st portion and the 2nd portion) with a symmetric key C 503 in step 560 and stores the symmetric key C 503 locally. The symmetric key 503 is available for decryption at a later time for improved performance In such solutions, however, once the user equipment 210 is compromised and the key C 503 is exfiltrated and/or stolen, the email data 507*a* would be at risk. In contrast, as shown in FIG. 5A, the email data 507*a* stored on the user equipment 210 is encrypted with an asymmetric key, e.g., a public key corresponding to the private key B 501. As such, even if the user equipment 210 is compromised, without the private key B 501 being stored independently on the safe case 220, the email data 507*a* cannot be decrypted and/or verified. Accordingly, without device independent crypto services provided by the crypto engine 222, the application 213 would not be able to access the email data 507*a* in decrypted form on the user equipment 210 and/or disseminate the email data. Thus, the crypto engine 222 along with the safe case 220 adds another layer of protection to the email data 507*a* on the user equipment 210. By not using a local key C 503 and relying on the safe case 220 to produce the key for decrypting the email data 507*a* (e.g., at least the email body) each and every time an email is accessed, the crypto engine 222 and/or the safe case 220 enhance the security. In some embodiments, based on configurations and/or for backward compatibility purposes, the decrypted email data 507*a* is protected with both an asymmetric key and the symmetric key C 503 in step 560.

In FIG. 5B, the key store 232 stores a private key 504. When the application 505 attempts to send data 507*b* from the user equipment 210, the adapter 217 enables the application 505 to send a signature of the data 507*b* (e.g., a hash of the data) in a request message to the safe case 220 over the secure session 514 in step 570. Upon receiving the signature of the data 507*b*, in step 572, the crypto engine 222 further signs the signature of the data 507*b* using the private key 504 in the key store 232. The crypto engine 222 then sends the signed signature of data (also referred to as the signed hash of data) in a reply message to the adapter 217 over the secure session 514 in step 574. The signed hash of data is then attached by the application 505 and send to the server 120. The server 120 then verifies the signature using the public key in step 578. Upon successful verification, the server 120 establishes a user session with the application 505 in step 580. With the established user session, the application 505 can transmit the data 507*b* to a remote source, e.g., an email recipient.

As shown in FIG. 5B, without the private key 504 and the signing by the device independent crypto engine 222, the signature cannot be verified with the public key at the server 120 and the user session between the server 120 and the application 505 cannot be established. Consequently, without the established user session, the data 507*b* (e.g., the email) cannot be transmitted to a remote source. As such, by keeping the private key 504 off the user equipment 210 and performing the signing process off the user equipment 210, even if the user equipment 210 is compromised, the data 507*b* would not be distributed to the remote source.

Figure 6:
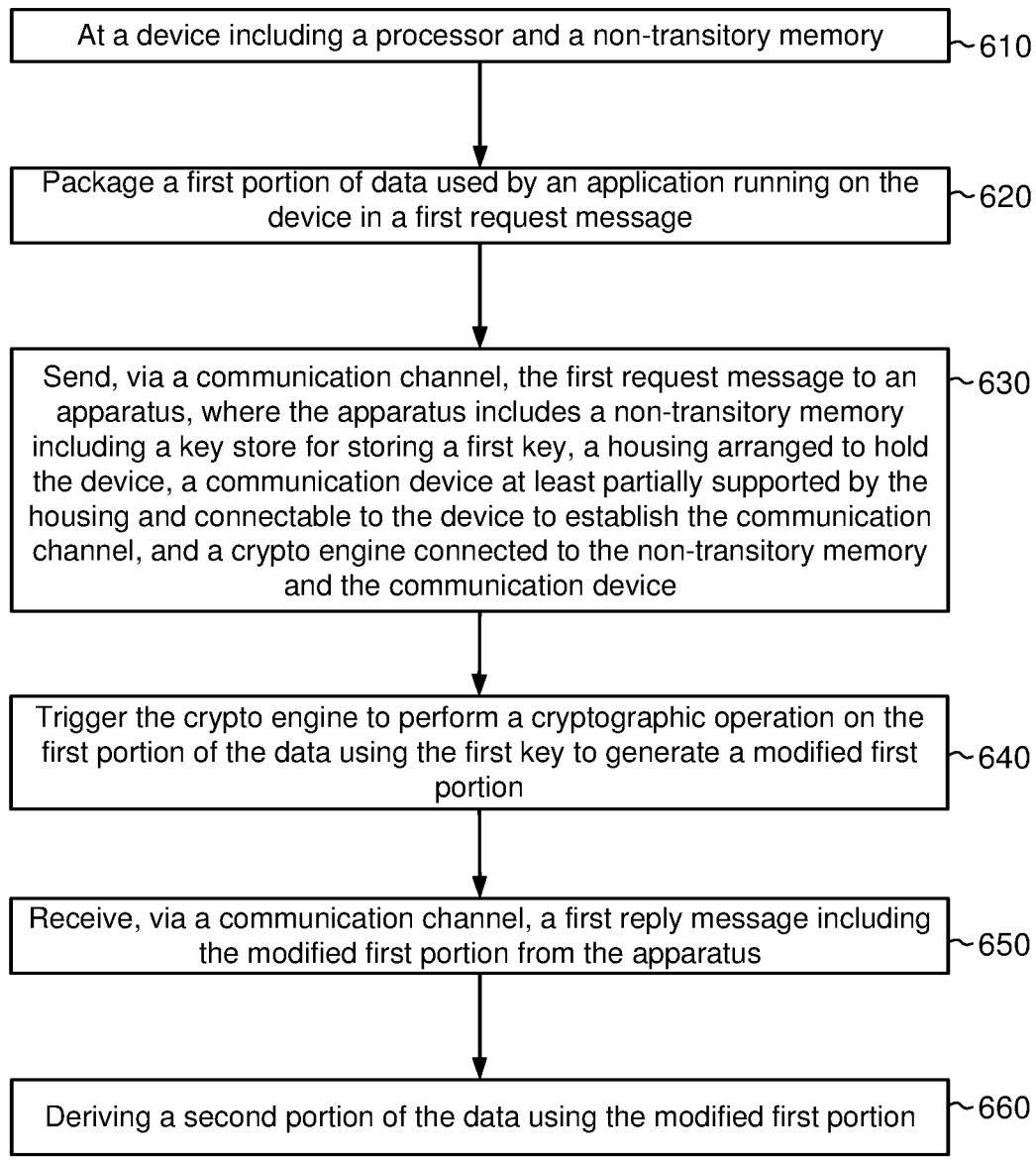
FIG. 6 is a flowchart illustrating a method for access and using device independent crypto services in accordance with some embodiments.

FIG. 6 is a flowchart illustrating a method 600 for accessing and using device independent crypto services in accordance with some embodiments. In some embodiments, the method 600 is performed at a device (e.g., the user equipment 210 in FIG. 2) that includes a processor (e.g., the processor 212 in FIG. 2) and a non-transitory memory (e.g., the memory 211 in FIG. 2), as represented by block 610. In some embodiments, the device includes an application (e.g., the application 213 as shown in FIG. 3) and an adapter (e.g., the adapter 217 as shown in FIGS. 2 and 3), where the adapter is integrated with the application in accordance with some embodiments. As such, the method 600 is performed by the adapter in accordance with some embodiments.

The method 600 begins with the adapter packaging a first portion of data used by an application running on the device in a first request message, as represented by block 620. As represented by block 630, the adapter further sends, via a communication channel, the first request message to an apparatus. As described above with reference to FIGS. 2 and 3, the apparatus (e.g., the safe case 220) in the system 200 includes a housing (e.g., the housing 225 in FIG. 2) that is arranged to hold the device, e.g., holding the user equipment 210 in FIG. 2. In some embodiments, the apparatus also includes a communication device (e.g., one of the communication device(s) 240, FIG. 2) that is at least partially supported by the housing and connectable to the device to establish the communication channel, e.g., to pair the communication device 240 and the communication device 214 in FIG. 2. In some embodiments, the apparatus also includes a non-transitory memory (e.g., the memory 230 in FIG. 2) that includes a key store for storing a first key (e.g., in the key store 232 in FIGS. 2 and 3). In some embodiments, the apparatus additionally includes a crypto engine (e.g., the controller/crypto engine 222 in FIG. 2).

As represented by block 640, the method 600 further includes triggering the crypto engine to perform a cryptographic operation on the first portion of the data using the first key to generate a modified first portion. For example, in FIG. 3, in response to receiving the request message, the crypto engine 222 performs crypto services in step 355. As represented by block 650, the adapter further receives, via the communication channel, a first reply message including the modified first portion of the data from the apparatus. As represented by block 660, the adapter further decrypts a second portion of the data using the modified first portion.

In some embodiments, deriving the second portion of the data using the modified first portion includes extracting a second key from the modified first portion, and decrypting the second portion of the data using the second key to generate a modified second portion. In such embodiments, the adapter further provides the data for display, which includes providing the modified second portion for display. For example, in FIG. 5A, the adapter 217 receives the decrypted email header (e.g., the modified first portion) in step 540 and decrypts the email body (e.g., the second portion) using the key A 502 (e.g., the second key) extracted from the reply message in step 550. The adapter 217 then provides the decrypted email body (and possibility the email header) to the application 505 for display.

In some embodiments, the method 600 further includes initializing the adapter by the application to trigger a registration of the adapter and/or the application with a connectivity module (e.g., the connectivity module 215 in FIGS. 2 and 3) running on the device (e.g., as shown in steps 342 and 346 in FIG. 3), where the connectivity module connects with the communication device on the apparatus to establish the communication channel In some embodiments, upon registration, the adapter further obtains from the connectivity module an identifier of the apparatus (e.g., obtaining the safe case UUID as shown in step 348 in FIG. 3). In some embodiments, the adapter then establishes a session with the apparatus over the communication channel using the identifier of the apparatus, e.g., the adapter 217 establishes a secure session with the designated safe case 220 over a BLE connection in FIG. 3. In some embodiments, the communication to and from the safe case carry end-to-end encrypted traffic, such that the method 600 further includes encrypting the communication channel in accordance with the registration being successful and pairing of the device and the apparatus. In some embodiments, during the registration and/or session establishment, the safe case authenticates the user of the device, e.g., based on the data obtained from the device and/or the data collected independently by the safe case. Upon a successful authentication, the safe case allows the connection and/or the session establishment.

In some embodiments, to further protect the data, the adapter generates encrypted data by encrypting the data with a symmetric key and allowing storing of the encrypted data and the symmetric key in the non-transitory memory. For example, in FIG. 5A, the email data 507a is encrypted with the symmetric key C 503 and both the encrypted email data 507a and the symmetric key C 503 are stored on the user equipment 210.

In some embodiments, the method 600 further includes generating a hash of outgoing data, sending a second request message including the hash to the apparatus, causing the crypto engine to generate a signature by signing the hash using the first key, receiving a second reply message including the signature from the apparatus; and distributing the outgoing data with the signature attached. For example, in FIG. 5B, the adapter 217 creates a hash of the email data 507a to be signed. The adapter 217 then sends the hash to the safe case 220 in step 570. The safe case 220 performs signing with the private key 504 on the hash in step 572. The safe case 220 then sends the signed hash to the adapter 217 in step 574. The adapter 217 allows the application 505 to attach the signed hash as the signature to the data 507b and sends the data 507b in step 576.

Figure 7:
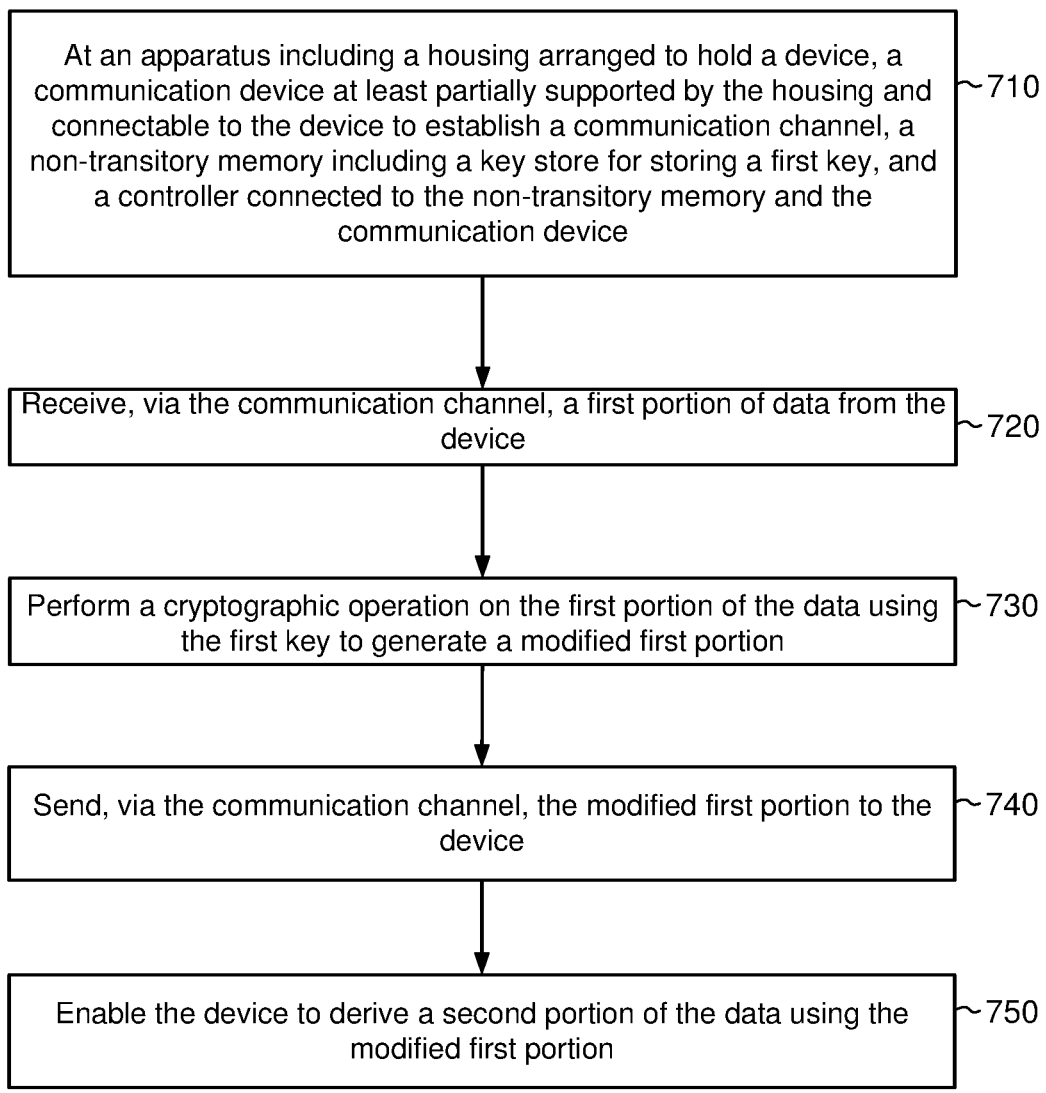
FIG. 7 is a flowchart illustrating a method for providing device independent crypto services in accordance with some embodiments.

FIG. 7 is a flowchart illustrating a method 700 for providing device independent crypto services in accordance with some embodiments. In some embodiments, as represented by block 710, the method 700 is performed at an apparatus (e.g., the safe case 220) in the system 200 that includes a device (e.g., the device 210) and the apparatus, as represented by block 710. In some embodiments, the device includes an application (e.g., the application 213 as shown in FIG. 3) and an adapter (e.g., the adapter 217 as shown in FIGS. 2 and 3), where the adapter is integrated with the application. In some embodiments, the apparatus includes a housing (e.g., the housing 225 in FIG. 2) that is arranged to hold the device, e.g., holding the user equipment 210 in FIG. 2. In some embodiments, the apparatus also includes a communication device (e.g., one of the communication device(s) 240, FIG. 2) that is at least partially supported by the housing and connectable to the device to establish a communication channel, e.g., to pair the communication device 240 and the communication device 214 in FIG. 2. In some embodiments, the apparatus also includes a non-transitory memory (e.g., the memory 230 in FIG. 2) that includes a key store for storing a first key (e.g., in the key store 232 in FIGS. 2 and 3). In some embodiments, the apparatus additionally includes a controller (e.g., the controller/crypto engine 222 in FIG. 2). In particular, the method 700 is performed by the controller of the apparatus.

The method 700 begins with the controller receiving, via the communication channel, a first portion of data (e.g., s/MIME email header) from the device (e.g., receiving the request message with the first portion of data in step 520 in FIG. 5A), as represented by block 720. The method 700 continues with the controller performing a cryptographic operation on the first portion of the data using the first key to generate a modified first portion (e.g., decrypting the first portion using the private key B 501 in step 530 in FIG. 5A), as represented by block 730. The method 700 continues with the controller sending, via the communication channel, the modified first portion to the device (e.g., sending the decrypted first portion in step 540 in FIG. 5A), as represented by block 740. The method 700 further continues with the controller enabling the device to derive a second portion of the data using the modified first portion of the data (e.g., enabling the adapter 217 to decrypt the second portion using the symmetric key A 502 in step 550 in FIG. 5A), as represented by block 750.

In some embodiments, the first key is a private key (e.g., key B 501 in FIG. 5A is an asymmetric private key). For example, during an enrollment phase, the safe case generates a public/private key pair or loads and imports an external key, e.g., through public key infrastructure (PKI) integration to integrate with an external PKI or utilize a private PKI.

In some embodiments, the method 700 further includes establishing a session over the communication channel upon a successful registration and pairing of the personal communication device and the apparatus (e.g., as represented in steps 342-350 in FIG. 3). In such embodiments, the controller receives the first portion of the data in a request message over the session (e.g., as represented in step 354 in FIG. 3) and sends a reply message over the session (e.g., as represented in step 356 in FIG. 3), where the reply message includes the modified first portion of the data (e.g., as represented in step 540 in FIG. 5A). In such embodiments, the method 700 further includes encrypting the communication channel upon the successful registration and pairing of the device and the apparatus in accordance with some embodiments.

In some embodiments, the key store further includes a second key for decrypting the second portion of the data, and the method 700 further includes embedding the second key obtained from the key store with the decrypted portion of the data in the reply message. For example, in FIG. 5A, the crypto engine 222 decrypts email header using the asymmetric matching private key B 501 in step 530 and sends the symmetric key A 502 along with the decrypted email header to the adapter 217 in step 540.

In some embodiments, the modified first portion includes a second key and enabling the device to derive the second portion of the data using the modified first portion of the data includes triggering extraction of the second key from the modified first portion, and enabling deriving of the second portion of the data using the second key. For example, in FIG. 5A, the adapter 217, in response to receiving the reply message, the symmetric key A 502 is extracted from the reply message in step 550 and the email body is derived using the symmetric key A 502 for display.

In some embodiments, the method 700 further includes generating a signature of the data (e.g., using the first key or a different signing key) and sending the signed signature to the device over the communication channel. For example, in FIG. 5B, the crypto engine 222 signs the hash of data with the private key 504 in step 572 and sends the signed hash as the signature to the adapter 217 in step 574.

In some embodiments, the method 700 further includes authenticating a user of the device and ceasing to perform the cryptographic operation on the first portion of the data in accordance with failing to authenticate the user. As such, in FIG. 2, the safe case 220 actively monitors the user equipment 210. In case the safe case 220 determines that the user equipment 210 is compromised by an unauthenticated and/or unauthorized user, the safe case 220 ceases to provide device independent crypto services. Without the device independent crypto services, the data on the user equipment cannot be rendered and/or distributed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a device;
   a non-transitory memory that includes a key store for storing a first key;
   a communication device at least partially supported by the housing and connectable to the device to establish a communication channel with the device; and
   a controller connected to the non-transitory memory and the communication device and operable to:
   receive, via the communication channel, a first portion of data from the device;
   perform a cryptographic operation on the first portion of the data using the first key to generate a modified first portion;
   send, via the communication channel, the modified first portion to the device; and
   enable the device to derive a second portion of the data using the modified first portion, including enabling the device to extract a second key from the modified first portion and decrypt the second portion of the data using the second key to generate a modified second portion, and enabling the device to display the modified second portion.

2. The apparatus of claim 1, wherein the first key is a private key.

3. The apparatus of claim 1, wherein the controller is further operable to:
   establish a session over the communication channel upon a successful registration and pairing of the device and the apparatus;
   receive the first portion of the data in a request message over the session; and
   send a reply message over the session, wherein the reply message includes the modified first portion of the data.

4. The apparatus of claim 3, wherein the controller is further operable to:
   encrypt the communication channel upon the successful registration and pairing of the device and the apparatus.

5. The apparatus of claim 1, wherein the modified first portion includes a second key, and enabling the device to derive the second portion of the data using the modified first portion includes:
   triggering extraction of the second key from the modified first portion; and
   enabling deriving of the second portion of the data using the second key.

6. The apparatus of claim 1, wherein the controller is further operable to:
   generate a signature of the data; and
   send the signature to the device over the communication channel.

7. The apparatus of claim 1, wherein the controller is further operable to:
   authenticate a user of the device; and
   cease to perform the cryptographic operation on the first portion of the data in accordance with failing to authenticate the user.

8. A method comprising:
at a device including a processor and a non-transitory memory:
packaging a first portion of data used by an application running on the device in a first request message;
sending, via a communication channel, the first request message to an apparatus, wherein the apparatus includes a non-transitory memory including a key store for storing a first key, a housing arranged to hold the device, a communication device at least partially supported by the housing and connectable to the device to establish the communication channel, and a crypto engine connected to the non-transitory memory and the communication device;
triggering the crypto engine to perform a cryptographic operation on the first portion of the data using the first key to generate a modified first portion;
receiving, via the communication channel, a first reply message including the modified first portion from the apparatus;
deriving a second portion of the data using the modified first portion;
extracting a second key from the modified first portion;
decrypting the second portion of the data using the second key to generate a modified second portion; and
displaying the modified second portion.

9. The method of claim 8, further comprising:
initializing by the application to trigger a registration with a connectivity module running on the device, wherein the connectivity module connects with the communication device on the apparatus to establish the communication channel;
obtaining from the connectivity module an identifier of the apparatus; and
establishing a session with the apparatus over the communication channel using the identifier of the apparatus.

10. The method of claim 9, further comprising:
encrypting the communication channel in accordance with the registration with the connectivity module being successful and pairing of the device and the apparatus.

11. The method of claim 8, wherein:
the first key is a private key; and
the method further includes storing in the non-transitory memory the data encrypted with a public key corresponding to the private key.

12. The method of claim 8, further comprising:
generating a hash of outgoing data;
sending a second request message including the hash to the apparatus;
causing the crypto engine to generate a signature by signing the hash using the first key;
receiving a second reply message including the signature from the apparatus; and
distributing the outgoing data with the signature attached.

13. A system comprising:
a device including an application and an adapter integrated with the application; and
an apparatus including a housing arranged to hold the device, a communication device at least partially supported by the housing and connectable to the device to establish a communication channel, a non-transitory memory including a key store for storing a key, and a controller, wherein the controller is operable to,
receive from the application on the device, via the adapter and over the communication channel, at least a portion of data;
perform a cryptographic operation on at least the portion of the data using the key to generate modified data in response to receiving at least the portion of data; and
send to the application on the device, via the adapter and over the communication channel, the modified data to enable access by the application to the data including the modified data, including enabling the application to extract a second key from the modified first portion and decrypt the second portion of the data using the second key to generate a modified second portion, and enabling the device to display the modified second portion.

14. The system of claim 13, wherein the apparatus is modular and distinct from the device.

15. The system of claim 13, wherein the controller is further operable to generate the key and store the key in a secure portion of the non-transitory memory.

16. The system of claim 13, wherein the controller is further operable to:
initialize by the application to trigger a registration with a connectivity module running on the device, wherein the connectivity module connects with the communication device on the apparatus to establish the communication channel;
obtain from the connectivity module an identifier of the apparatus; and
establish a session with the apparatus over the communication channel using the identifier of the apparatus.

17. The system of claim 16, wherein the session is established upon a successful registration and pairing of the device and the apparatus, and the controller is further operable to:
receive at least the portion of the data in a request message over the session; and
send a reply message over the session, wherein the reply message includes the modified data.

18. The system of claim 13, wherein the controller is further operable to:
authenticate a user of the device; and
cease to perform the cryptographic operation on at least the portion of the data using the key in accordance with failing to authenticate the user.

* * * * *